United States Patent [19]

Wollensak et al.

[11] 4,314,962

[45] Feb. 9, 1982

[54] PHENOL EXTENDED POLYURETHANES PREPARED BY RIM PROCESS

[75] Inventors: John C. Wollensak, Bloomfield Hills; Kryn G. Ihrman, Farmington, both of Mich.

[73] Assignee: Ethyl Corporation, Richmond, Va.

[21] Appl. No.: 220,749

[22] Filed: Dec. 29, 1980

[51] Int. Cl.$^3$ .................. B29F 1/00; C08G 18/32
[52] U.S. Cl. .................. 264/328.6; 264/328.16; 264/328.17; 528/65; 528/85; 528/502
[58] Field of Search .................. 528/65, 85, 502; 260/DIG. 40; 264/328, 331

[56] References Cited

U.S. PATENT DOCUMENTS

| | | | |
|---|---|---|---|
| 2,683,730 | 7/1954 | Seeger et al. | 260/453 |
| 2,915,496 | 12/1959 | Swart et al. | 260/45.7 |
| 3,085,991 | 4/1963 | Finelli | 260/45.95 |
| 3,362,979 | 1/1968 | Bentley | 260/453 |
| 3,385,820 | 5/1968 | Finlay | 260/45.95 |
| 3,573,251 | 3/1971 | Megna et al. | 260/45.8 |
| 3,706,680 | 12/1972 | Booth | 260/2.5 AM |
| 3,752,790 | 8/1973 | McShane et al. | 260/77.5 AM |
| 3,925,296 | 12/1975 | Stone et al. | 260/DIG. 40 |
| 3,933,727 | 11/1976 | Schmid | 260/DIG. 40 |
| 4,203,889 | 5/1980 | Chang et al. | 260/45.8 NT |

FOREIGN PATENT DOCUMENTS 1534258 11/1978 United Kingdom .

*Primary Examiner*—H. S. Cockeram
*Attorney, Agent, or Firm*—Donald L. Johnson; Joseph D. Odenweller; John F. Hunt

[57] ABSTRACT

Polyurethanes can be produced using dihydroxyaromatic compounds as chain extenders. Preferred polyurethanes of this type are RIM (reaction injection molding) molded products or cast elastomers. The dihydroxyaromatic compounds are preferably selected from:

I. dihydroxybenzenes and alkyl-substituted dihydroxybenzenes wherein the alkyl groups have up to about 6 carbon atoms and the total number of carbon atoms in the alkyl groups in said alkyl-substituted dihydroxybenzene is up to about 12 carbon atoms, and II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12;

said dihydroxyaromatic compounds being further characterized by having no more than one tert-alkyl group on a position adjacent to any hydroxy group.

3 Claims, No Drawings

PHENOL EXTENDED POLYURETHANES PREPARED BY RIM PROCESS

BACKGROUND OF THE INVENTION

It has been known since 1937 that useful polymers can be made from the poly-addition reaction of isocyanates with glycols and diamines. Such polymers are now fabricated in many forms including elastomers, fibers, coatings, adhesives and rigid and flexible foams.

Cast elastomers are produced by conducting the necessary chemical reactions in a mold. Urethane cast elastomers are used in tires, grain chute liners, conveyer belts and in many other uses. It is known to use amines such as 4,4'-methylenebis(2-chloroaniline) as a chain extender in this process; see for example, U.S. Pat. No. 3,752,790. Presently, the use of this chain extender is not favored because of its toxicological properties.

The basic principles of the RIM (reaction injection molding) process were developed in Germany by Bayer AG. At first, these investigations were directed toward production of high density, integral skin, rigid foams. Later, the studies evolved into investigation of the preparation of automative parts by the RIM process. Typically this process has been used to produce elastomeric urethanes in molded parts used in production of fascia for front and rear ends of automobiles. Some amines have been suggested for use as chain extenders in RIM; it has also been suggested that butanediol be used as a chain extender, Prepelka, D. J. et al, *Advances in Reaction Injecting Molding*, pages 132-165, (1975) in *Advances in Urethane Science Technology*.

It has previously been suggested that the addition of certain alkyl substituted hydroxy aryl compounds to polyurethane compositions which are the reaction products of a polyester or polyether glycol and a polyisocyanate tend to stabilize the polyurethane compositions against degradation by heat and light. For example, U.S. Pat. No. 2,915,496 discloses the addition of alkyl substituted hydroxy aryl compounds having an alkyl group of at least 3 carbon atoms located at a position ortho to each hydroxy group to polyurethane compositions which are the reaction products of long chain polyethers and polyisocyanates to retard or resist degradation of the compositions caused by exposure to oxygen or ozone. Reportedly, the life of polyether-urethane foams have been increased many times by the use of such antioxidants which cannot react with the isocyanate compounds of the polyurethane compositions.

U.S. Pat. No. 3,385,820 discloses the stabilization of thermoplastic polyalkyleneether polyurethanes and polyurethaneamides against heat- and light-induced degradation by the incorporation therein of a synergistic combination of certain phenolic stabilizers used in particular concentrations. The phenolic antioxidants are a mixture of (A) 4,4'-butylidenebis-(2-t-butyl-5-methylphenol) and (B) 2,2'-methylenebis-(4-methyl-6-t-butylphenol) with the proviso that the weight ratio of (A) to (B) present is in the range of 2:1 to 9:1.

U.S. Pat. No. 4,203,889 discloses at column 4, lines 29-36 several known hindered phenolic antioxidants commonly used to reduce the deterioration of polyurethane compositions due to nitrogen oxide fumes. Included are 2,6-di-t-butylphenol, 2,6-di-t-butyl-p-cresol, 2,2'-methylenebis(4-methyl-6-t-butylphenol), 4,4'-butylidenebis(6-t-butyl-m-cresol), 4,4'-methylenebis(2,6-di-t-butylphenol), 4,4'-thiobis(6-t-butyl-o-cresol), 4,4'-thiobis(6-t-butyl-m-cresol), styrenated phenols and styrenated cresols, such as Wingstay S, and the like.

U.S. Pat. No. 3,573,251 discloses the addition of certain substituted phenols in combination with certain organic phosphites to polyurethane elastomers to render them resistant to discoloration on exposure to atmospheric fumes and ultraviolet radiation. Typically substituted phenols have the formulae:

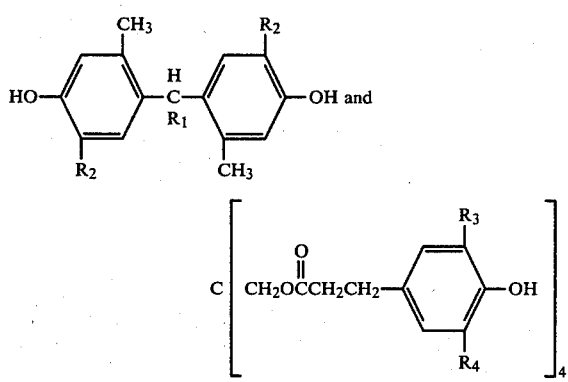

where $R_1$ is hydrogen or alkyl ($C_1$-$C_8$); $R_2$ is alkyl ($C_4$-$C_8$); and $R_3$ and $R_4$ are alkyl ($C_1$-$C_8$). Typical organic phosphites have the formulas:

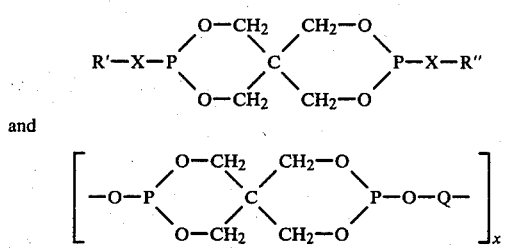

where $R'$ are $R''$ are alkyl ($C_6$-$C_{18}$); X is oxygen or sulfur; Q is a hydrogenated bisphenol A residue; and x is sufficient to provide a molecular weight of at least 1,000.

U.S. Pat. No. 3,085,991 discloses the addition of monosubstituted phenols which may be grouped into the classes consisting of monoalkyl ethers of dihydroxybenzene, alkyl or alkylated phenols, chloro or chlorinated phenols and the nitro phenols to stabilize or prevent uncontrolled post curing of freshly prepared polyurethane gum stock without the necessity for sheeting and treating the sheeted material to effect stabilization.

U.S. Pat. No. 3,706,680 discloses foamed polyurethanes prepared from diphenols and polyisocyanates. The diphenols are compounds having the general formula:

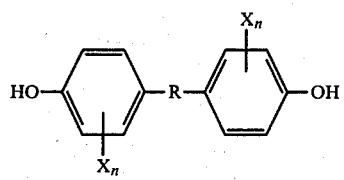

wherein R is an alkylidene radical, containing from 1 to about 8 carbon atoms,

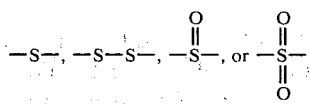

X is halogen, or an alkyl radical, preferably having from 1 to 12 carbon atoms and n is a positive integer from 0 to 3.

The diphenol starting materials are preferably 4,4'-isopropylidene diphenols having the general formula:

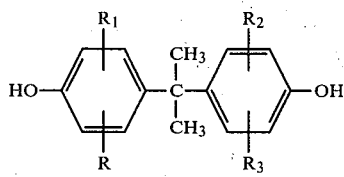

wherein R, $R_1$, $R_2$, and $R_3$ are independently selected from the group consisting of hydrogen, chlorine, bromine, and alkyl radicals having from 1 to 12 carbon atoms.

Applicants have now discovered that polyurethanes can be produced using dihydroxyaromatic compounds as chain extenders. Preferred polyurethanes of this type are RIM molded products or cast elastomers.

Thus, the compositions of this invention include a polyurethane which is the reaction product of an organic polyisocyanate with:
(a) an aliphatic polyhydroxy compound having two or more aliphatic hydroxy groups and a molecular weight within the range of from about 400 to about 7000, and
(b) an aromatic chain extender having two aromatic hydroxy groups each containing a reactive hydrogen, which is either a liquid or is soluble in said aliphatic polyhydroxy compound at a reaction temperature employed to produce said polyurethane;

the amount of said dihydroxyaromatic chain extender being from about 5 to about 30 weight percent of the total weight of said aromatic chain extender, aliphatic polyhydroxy compound and polyisocyanate; the amount of said aliphatic polyhydroxy compound being such that there is a substantially stoichiometric ratio of isocyanate groups on the one hand and the total of hydroxy groups in said aliphatic polyhydroxy compound and said chain extender on the other hand; said dihydroxyaromatic chain extender being selected from
  I. dihydroxybenzenes and alkyl-substituted dihydroxybenzenes, wherein the alkyl groups have up to about 6 carbon atoms and the total number of carbon atoms in the alkyl groups in said alkyl-substituted dihydroxybenzene is up to about 12 carbon atoms, and
  II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12;
said dihydroxyaromatic chain extenders being further characterized by having no more than one tert-alkyl group on a position adjacent to any hydroxy group.

SUMMARY OF THE INVENTION

This invention has the following aspects:

(i) Compositions of matter which are products obtained by the use of the dihydroxybenzenes of the type defined herein as chain extenders for the urethane reaction. These compositions include the polyurethane products per se, as well as the articles made therefrom. Further, these compositions include the various mixtures of the dihydroxybenzenes and other urethane-forming substances used in the formation of the polyurethane polymers of this invention. Such mixtures include, for example, a mixture injected into the mold for the RIM process, which mixture comprises a dihydroxybenzene chain extender of this invention with the other chemical substances used to prepare the RIM-produced part.

This invention also embodies processes for preparing the aforementioned products. Thus, this invention comprises processes embodying RIM and cast elastomer preparation technology. As to the RIM process, this invention comprises
(i) at a temperature within the range of about 15° C. to about 100° C. subjecting to static impingement mixing
  (a) a catalyst,
  (b) an organic polyisocyanate,
  (c) an aliphatic polyhydroxy compound having two or more aliphatic hydroxy groups and a molecular weight within the range of from about 400 to about 7000, and
  (d) an aromatic chain extender having two aromatic hydroxy groups each containing a reactive hydrogen which is either a liquid or is soluble in said aliphatic polyhydroxy compound at a temperature within the range of about 15° C. to about 100° C. said dihydroxyaromatic compound being selected from
   I. dihydroxybenzenes and alkyl-substituted dihydroxybenzenes, wherein the alkyl groups have up to about 6 carbon atoms and the total number of carbon atoms in the alkyl groups in said alkyl-substituted dihydroxybenzenes has up to about 12 carbon atoms, and
   II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12; whereby a preproduct is produced,
(ii) subsequently injecting a shot of said preproduct at said temperature into a closed preheated mold having a temperature of from about 15° C. to about 100° C.,
(iii) opening the mold and removing the formed polyurethane molded product, and
(iv) optionally subjecting said molded product to a postcure at a temperature within the range of from about 50° C. to about 150° C.; said process being conducted such that the amount of dihydroxyaromatic compound is from about 5 to about 30 weight percent of the total weight of components (a)-(d) and such that there is a substantially stoichiometric ratio of isocyanate groups on the one hand and the total of hydroxy groups in said aliphatic polyhydroxy compound and said dihydroxyaromatic chain extender on the other.

As to the preparation of cast elastomers, this invention comprises (a) at a temperature of about 25° C. to about 150° C. forming a prepolymer by reacting (i) an organic polyisocyanate and (ii) an aliphatic polyhydroxy compound having two or more aliphatic hydroxy groups and a molecular weight of about 400 to about 7000, subsequently (b) at a temperature of from about 80° C. to about 150° C. reacting with said prepolymer thereby produced a dihydroxyaromatic chain extender selected from I. dihydroxybenzenes and alkyl-substituted dihydroxybenzenes wherein the alkyl groups have up to about 6 carbon atoms and the total number of carbon atoms in the alkyl groups in said alkyl-substituted dihydroxybenzene is up to about 12 carbon atoms, and II. alkylene bridged, alkyl-substituted bisphenols wherein the alkylene bridge contains up to about 6 carbon atoms and the total number of carbon atoms in the alkyl groups attached to each benezenoid nucleus is at least two but does not exceed about 12;

said dihydroxyaromatic compounds being further characterized by having no more than one tert-alkyl group on a position adjacent to any hydroxy group;

(c) said process being conducted such that the amount of dihydroxyaromatic compound is from about 5 to about 30 weight percent of the total weight of said dihydroxyaromatic compound and components (i) and (ii) and such that there is a substantially stoichiometric ratio of isocyanate groups on the one hand and the total of hydroxy groups in said aliphatic dihydroxy compound and said dihydroxyaromatic chain extender on the other.

DESCRIPTION OF PREFERRED EMBODIMENTS

This invention pertains to improved polyurethane systems, more particularly in one aspect it pertains to polyurethane systems for reaction injection molding (RIM). Reaction injection molding is a rapid, typically one-step process for producing essentially integral skin, elastomeric parts. RIM is a relatively new process rapidly taking its place alongside more established plastic processes. It was developed to compete with injection molding of thermoplastic urethane and rubber for large, thin fascia for the front and rear ends of automobiles. The earliest development was in Europe where it is widely used today in the production of furniture, cabinets, and building components.

The process requires liquid components which can be catalyzed to produce rapid polymerization at low temperatures.

The process comprises separate feeding of polyol and isocyanate under very precise control with high-pressure metering pumps into a mixing head where the liquid streams are mixed under very high velocity and then injected into a closed mold. An alternative method utilizes piston displacement of the liquids at controlled rates to meter the reactants into the mixing head.

Typically, the mixing head is self-cleaning and mounted on the mold. It contains a relatively small, usually cylindrical, mixing chamber of the static impingement type where the liquid streams are mixed. The head usually has a valving mechanism that directs into the mixing chamber where the 'shot' is made. The head usually has a piston to clean the mixing chamber and seal the mold after the shot is completed.

The mold functions as a minature chemical reactor in which the polymer is formed. A variety of mold constructions has been used. Steel is preferred for high-volume production. Molds made from epoxy-reinforced nickel shells, machined or cast aluminum, and cast kirksite also have been used. For prototype parts reinforced epoxy or sprayed metal molds offer a relatively inexpensive option. The mold is equipped with a simple aftermixer, a runner, and a gate. The cross-sectional area of the gate should be designed to insure laminar flow into the mold cavity. Turbulent flow can result in splashing and entrainment of air bubbles. Controlled venting of air from the mold is essential to avoid trapped air in the part. The mold is sprayed with a release agent between shots. A range of mold release agents specifically designed for use in the RIM process is available.

After entering the mold, the expanding reaction mixture exerts sufficient pressure to fill the mold. Reactivity is very fast with mold residence times as short as 30 sec., and shot-to-shot molding cycles as low as 2 min. Pressure within the mold normally does not exceed 100 p.s.i. Part thickness normally ranges from 0.100 to 0.150 in. and density from 60 to 68 lb. cu. ft.

*Modern Plastics Encyclopedia*, 1979–1980, page 368 lists the following process advantages for RIM:

"Because RIM involves the injection of liquid intermediates into the mold, its inherent advantages over other high-speed plastic processing techniques include:

(1) Lower temperatures. The temperatures of the injected liquid streams are in the range of 75° to 150° F. Mold temperatures are 120° to 170° F. Since the reaction is exothermic, little added heat is required.

(2) Lower pressures. The in-mold pressure normally is less than 50 p.s.i., requiring less clamping force than the other processes. Clamping forces in tons can be estimated as equal to 0.05 times the projected area of the part in sq. in.

(3) Reduced tooling (mold) costs. Because of the low pressures, lighter-weight molds can be used than those required for injection molding. Finishing of the tool, however, is critical since the surface of the part will duplicate the mold surface.

(4) Reduced energy consumption. Because of the low temperatures and pressures, RIM requires only 10 to 30% of the energy needed for injection molding comparable parts.

(5) Lower equipment costs. Capital investment for RIM machines is significantly lower because liquid intermediates and lower pressures are involved.

(6) Design flexibility. Production of large parts with complex shapes, variable wall thicknesses, ribbing, and bosses is facilitated by the RIM process. Since the reactants fill the mold as a liquid and then polymerize, there are no stresses molded into the parts.

Cycle times feasible with current RIM technology are in the range of 2 to 4 min." Further, on the same page, the Encyclopedia gives the following breakdown of cycle time:

| Operation | Time, sec. |
| --- | --- |
| Injection | 2–5 |
| Polymerization | 18–55 |
| Mold opening/part removal | 20–60 |

-continued

| Operation | Time, sec. |
| --- | --- |
| Cleaning/inspection | 30–60 |
| Mold release spraying/closing | 30–60 |
| Total cycle | 100–240 |

RIM can be used to make rigid structural foams, low-modulus elastomers, or high-modulus elastomers. As indicated above, rigid structural foams were the earliest RIM development in Europe. Such foams are widely used today in Europe in furniture, cabinets and building components. In the U.S. the major application is housings for electronic equipment. *Modern Plastics Encyclopedia, supra,* page 100, gives the following tabulation of typical foams:

| Property | Value |
| --- | --- |
| Thickness, in. | 0.5 |
| Specific gravity | 0.6 |
| Skin hardness, Shore D | 80 |
| Flexural strength, $10^3$ p.s.i. | 4.9–6.0 |
| Flexural modulus, $10^3$ p.s.i. | 130–160 |
| Compressive strength, $10^3$ p.s.i. | 2.5–2.8 |
| Tensile strength, $10^3$ p.s.i. | 2.7–3.4 |
| Heat deflection temp at 66 p.s.i., °F. | 194–205 |
| Charpy impact, unnotched, ft.-lb./sq. in. | 6.7–7.2 |

Low-modulus elastomers are molded to produce fasias that cover energy-managing bumper systems. *Modern Plastics Encyclopedia, supra,* page 100, gives typical properties of a fascia as follows:

| Property | Value |
| --- | --- |
| Density, lb/cu. ft. | 65 |
| Hardness, Shore D | 50 |
| Tear strength, Die C, p.s.i. | 490 |
| Tensile strength, p.s.i. | 3500 |
| Elongation, % | 340 |
| Flexural modulus, $10^3$ p.s.i. | |
| At −30° C. | 64 |
| At 22° C. | 25 |
| At 65° C. | 18 |
| Sag, 4-in. overhang, 1 hr. at 120° C., in. | 0.4 |

High-modulus elastomers extend the RIM process to applications requiring greater rigidity. These include automobile trim parts, such as air spoilers, agricultural equipment, recreational vehicle components, ski boots, and motorcycle boots. On page 368, the *Encyclopedia* (*supra*) gives the following table which can be used to compare these types of RIM urethanes:

TABLE 1

| | Typical properties of RIM urethanes | | |
| --- | --- | --- | --- |
| Property | Rigid structural foam[a] | Low modulus elastomer[b] | High modulus elastomer[b] |
| Density, lb./cu. ft. | 37 | 62 | 62 |
| Hardness, Shore D | 80 | 55 | 70 |
| Tensile strength, p.s.i. | 3400 | 3350 | 4200 |
| Elongation at break, % | <5 | 250 | 100 |
| Flexural modulus at 75° F. $10^3$ p.s.i. | 160 | 25 | 125 |

[a] 0.5 in. thick sample
[b] 0.125 in thick sample

A more recent development is reinforced RIM, which is designated RRIM. In this technology, RIM plastics are reinforced with a filler such as milled glass, wollastonite or other mineral filters. These materials reduce the coefficient of thermal expansion and give a product also having a higher flexural modulus. This technology offers promise as a means of providing large exterior body parts such as fenders, which can be matched to steel.

Modifications of the RIM equipment are required in view of higher viscosities, greater abrasiveness of the filled liquid systems, and line clogging. On page 369, the *Encyclopedia, supra,* tabulates properties of high-modulus RRIM urethanes as follows:

TABLE

| | Properties of high-modulus RRIM urethanes | | |
| --- | --- | --- | --- |
| Property | No filler | 1/16 in. milled glass, 31 wt. % | Wollastonite, 32 wt. % |
| Specific gravity | 1.0 | 1.23 | 1.25 |
| Elongation, % | 80 | 15 | 10 |
| Flexural modulus, $10^3$ p.s.i. | 135 | 370 | 500 |
| Coefficient of thermal expansion, $10^{-6}$ in./in./°F. | 55 | 23 | 23 |

In a general aspect, the preparation of RIM polyurethanes of this invention can be depicted by the following equation wherein:

HO—R—OH is an aliphatic dihydroxy compound.
HO—R'—OH is a dihydroxyaromatic compound used as a chain extender in this invention.

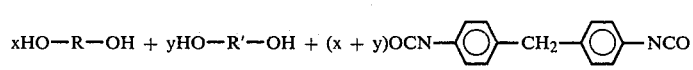

xHO—R—OH + yHO—R'—OH + (x + y)OCN—⟨◯⟩—CH$_2$—⟨◯⟩—NCO

-continued catalyst

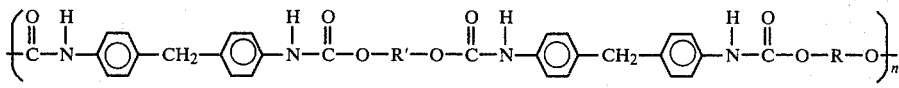

HO—R—OH = aliphatic dihydroxy compound
HO—R'—OH = dihydroxyaromatic compound of this invention As can been seen, the equation depicts use of enough diisocyanate to react with the diol and the chain extender. Best results are achieved when there is not a substantial excess of the hydroxyl compounds or the isocyanate. In other words, best results are achieved when the amount of the isocyanate on the one hand, and sum of the amounts of the two hydroxy compounds on the other, are in substantially stoichiometric balance.

The equation illustrates the use of MDI, i.e., 4,4'-methylenebis(phenylisocyanate) which is a preferred diisocyanate for preparing RIM polyurethanes according to this invention. Some commercial preparations of this compound have a minor amount of trinuclear components; however, these commercial materials can be used in this invention. This invention also includes polyurethanes derived from other polyisocyanates such as the following substances and mixtures thereof; m-phenylenediisocyanate; 2,4-toluenediisocyanate; 2,6-toluenediisocyanate; naphthalene-1,5-diisocyanate; 1,3,5-benezenetriisocyanate; and polyarylpolyalkylenepolyisocyanates such as a polymethylenepolyphenylisocyanate. Isocyanates prepared by the phosgenation of the reaction product between aniline and formaldehyde having a functionality of 2.2 to about 3.5 are described in U.S. Pat. Nos. 2,683,730 and 3,362,979. Additional applicable isocyanates are mentioned on pages 4–5 of British Pat. No. 1,534,258 and that disclosure of useful isocyanates from page 4, line 24, to page 5, line 10, is incorporated by reference herein as if fully set forth.

RIM polyurethanes of this invention are preferably made from polyether diols. More preferably, these polyether diol compounds predominatly have two hydroxy groups bonded to primary carbon atoms. Typically, in such more preferred materials up to about 90 percent of hydroxy groups present are primary. Polyether polyols suitable for use in this invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and or a higher oxide and then reacting the intermediate thereby produced with ethylene oxide.

The organic compounds used as polyhydroxy reactants in this invention are dihydroxy polyalkylene polyethers having at least two primary hydroxyl groups and a molecular weight of from about 400 to about 12000, more preferably from about 400 to about 7000 or 5000. Typically, such polyethers are made by polymerization of ethylene oxide, propylene oxide, butylene oxide, tetrahydrofuran, or the like. The materials may be polymerized alone, or as mixtures, or in a successive addition.

Polyurethanes produced by the above-described reactants are extended, i.e. chain-lengthened, by the dihydroxyaromatics of this invention. Such dihydroxy compounds contain phenolic hydroxyl groups which react with the isocyanate(s) used in the process of this invention. The reactivity of the hydroxy groups toward the isocyanate-groups should be about the same as the reactivity of the hydroxyl groups of the hydroxy polyether reactant(s). Thus, the reactivity of the aliphatic hydroxyls and aromatic hydroxyls toward the isocyanate group should be within about the same order of magnitude.

Furthermore, the hydroxyaromatic extenders of this invention are free of non-hydroxyl groups which react with the isocyanate, and thereby interfere with the desired urethane formation. Similarly, the dihydroxyaromatic compounds are also substantially inert toward the polyether glycol.

In light of the above, it will be clear to a skilled practitioner that the dihydroxyaromatic compounds used as chain extenders in this invention are free of group(s) that through a steric or electronic effect unduly restrain or accelerate the desired reaction, or cause an unacceptably high level of a side reaction to take place.

In addition to the above characteristics, the chain extenders provided by this invention are either liquids at reaction temperatures or are soluble or dispersible in the polyether glycol used in the RIM process. Preferred dihydroxyaromatics of the above type have a relatively low molecular weight. Thus, they have the desired physical and chemical properties without extraneous molecular structure which unduly adds to cost or which dilutes the reactive system injected into the mold. Still more preferably, the dihydroxyaromatics used in this invention have a toxicity lower than MOCA, i.e. 4,4'-methylenebis(2-chloraniline).

Exemplary alkylene bridged, alkyl-substituted bisphenol compounds which may be used as extenders in this invention include:

4,4'-methylenebis(2,6-diisopropylphenol)
4,4'-methylenbis(6-tert-butyl-o-cresol)
4,4'-methylenebis(2,6-di-sec-butylphenol)
4,4'-methylenebis(2,6-diethylphenol)
4,4'-methylenebis(2,6-dicyclopentylphenol)
4,4'-methylene-di-2,6-xylenol
2,2'-methylenebis(4,6-di-tert-butylphenol)
4,4'-ethylidenebis(6-tert-butyl-o-cresol)

The chain lengthening agents discussed above generally have alkyl groups of the type which are illustrated by those in the particular compounds listed above. It is to be understood, however, that the exact nature of the side chain(s) attached to the phenol nucleus are not critical so long as they do not unduly hinder or encumber the extender's ability to react as desired. Although this invention has as a preferred aspect, the use of 4,4'-alkylidenebisphenols, the listing above of 2,2'-methylenebis(4,6-di-tert-butylphenol) illustrates that this invention includes compounds in which the alkylidene bridge is in another position with respect to the phenolic hydroxyls. No matter where the bridge, symmetrical compounds, i.e. the "bis" compounds, are usually preferred, because they are generally less expensive than compounds having two different phenolic groups attached to the bridging moiety. However, it is to be understood that one may use unsymmetrical alkylidene-bridged bisphenols as chain extenders in this invention.

There may be one or more alkyl groups bonded to the phenolic nuclei by primary or secondary carbon atoms which contain 10, 12, 16 or more carbons. Usually, however, such long side chains don't contribute a substantial positive aspect to the nature of the chain extender. Therefore, in most instances, smaller alkyl groups for example, those of up to about six carbons are preferred.

Similarly, the alkylidene group which forms the bridge in the alkylidene-bridged bisphenols may contain up to 12 to 16 or more carbons. However, for reasons similar to those mentioned above, it is preferred that the bridge contain up to, say, about seven carbons. A preferred bridge is the methylene radical. Other preferred bridges, also have a 1,1-alkylidene structure; however, if desired the alkylidene group can be on a non-terminal carbon.

The chain lengthening agents used in this invention may also be dihydroxybenzene compounds which have the requisite reactivity and solubility or dispersability as discussed above. Exemplary mononuclear compounds which can be used as chain extenders in this invention are: catechol, resorcinol, hydroquinol, 4-tert-butylcatechol, tert-butyl-hydroquinol, 4-ethylresorcinol, 4-tert-butylresorcinol, 3,5-di-tert-butyl catechol, 3,6-di-isopropylcatechol, 3-iso-propylcatechol, 2-tert-butyl-6-methyl-hydroquinol, 4-methylcatechol, methyl-hydroquinol and 2-methylresorcinol.

The amount of isocyanate employed in the process of this invention is calculated so that the isocyanate index is from 75 to about 125, more preferably 90–110; most preferably about stoichiometric. The isocyanate index is equal to:

$$\frac{\text{number of isocyanate groups}}{\text{number of groups reactable with isocyanate}} \times 100$$

To prepare a polyurethane according to the RIM process of this invention, a catalyst is employed. A catalyst is used in order to accelerate the reaction so that the materials set rapidly in the mold. Catalysts which can be employed are of three types. The first type is an organo tin compound. Typically these are tin (II) salts of carboxylic acids and they are exemplified by dibutyl tin diacetate and dibutyl tin dilaurate. The second type of catalyst is a tertiary amine such as triethylamine and N-ethylmorpholine. A third type includes basic compounds, such as tetra-alkylammonium hydroxides, sodium hydroxide, alkali metal phenolates and the like. Typically the catalysts are used in an amount of from about 0.00001 to about 10 weight percent; more preferably from about 0.0001 to about 1.0 weight percent and still more preferably from about 0.01 to about 0.1 weight percent, said percentage being based on the weight of polyhydroxy organic compound described above.

The reaction mixture employed in the process of this invention can also include a minor amount of a blowing agent. The blowing agent liberates gas or vapor under the process conditions employed to produce a microfoam structure. This action assists in filling the mold with the reactive mixture. Suitable blowing agents are selected from water and volatile organic substances, such as the Freons exemplified by monoflorotrichloromethane, chlorodifloromethane and the like.

Volatile hydrocarbons, such as butane, hexane, heptane and similar compounds can also be used as blowing agents. The blowing agent may be a compound which liberates a gas by a chemical reaction which takes place under the reaction conditions employed. Thus, the blowing agent may be an azo compound such as azoisobutyrylnitrile. When a blowing agent is used, it is employed in an amount from one to about 20 parts per each 100 parts of the polymeric polyol described above.

The reactive mixtures of this invention may also include foam stabilizer. Usually these are polyether siloxanes such as a polydimethyl siloxane radical attached to a copolymer of ethylene oxide and prepolymer oxide. Furthermore, the reactive mixtures of this invention may include dyes, fillers, flame retardants, fungistatic additives and other additives commonly employed in preparing polyurethane articles. These materials are used in minor amounts so that their total is not more than about 1–5 parts per each 100 parts of polyether polyol described above.

As aforediscussed, the basic RIM process comprises the separate feeding of isocyanate and polyol under very precise control with high pressure metering pumps into a mixing head where the liquid streams are mixed under very high velocity and then injected into a closed mold. That is, two liquid streams, the first stream consisting of the isocyanate component of the RIM system, typically in combination with a blowing agent, and a second liquid stream consisting of the polyol, catalyst, surfactant, chain extender and other additive components of the system are mixed together and injected into the closed mold wherein the polymer is formed. Alternatively, however, the polyisocyanate component can be first reacted with the polyfunctional polyol material to form a liquid prepolymer and the prepolymer that is formed can then be mixed and reacted with the catalyst, surfactant, chain extender and other additive components of the system prior to injection into the mold.

Thus, a more preferred embodiment of the present invention is a process for preparing a reaction injection molding polyurethane molded product which comprises
(i) at a temperature within the range of about 15° C. to about 100° C. subjecting to static impingement mixing two liquid streams, the first stream comprising
(a) a catalyst,
(b) an aliphatic polyhydroxy compound having two or more aliphatic hydroxy groups and a molecular weight within the range of from about 400 to about 7000, and
(c) an aromatic chain extender having two aromatic hydroxy groups each containing a reactive hydrogen which is either a liquid or is soluble in said aliphatic polyhydroxy compound at a temperature within the range of about 15° C. to about 100° C. said dihydroxyaromatic compound being selected from
I. dihydroxybenzenes and alkyl-substituted dihydroxybenzenes, wherein the alkyl groups have up to about 6 carbon atoms and the total number of carbon atoms in the alkyl groups in said alkyl-substituted dihydroxybenzene has up to about 12 carbon atoms, and
II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12; and the second stream comprising (d) an organic polyisocyanate or prepolymer formed from an organic polyisocyanate and an aliphatic polyhydroxy compound whereby a liquid mixture is produced, (ii) subsequently injecting a shot of said liquid mixture at said temperature into a closed preheated mold having a temperature of from about 15° C. to about 100° C., (iii) opening the mold and removing the formed polyurethane molded product, and (iv) optionally subjecting said molded product to a post-cure at a temperature within the range of from about 50° C. to about 150° C.; said process being conducted such that the amount of dihydroxyaromatic compound is from about 5 to about 30 weight percent of the total weight of components (a)–(d) and such that there is a substantially stoichiometric ratio of isocyanate groups on the one hand and the total of hydroxy groups in said aliphatic polyhydroxy compound and said dihydroxyaromatic chain extender on the other.

In another aspect, this invention also pertains to urethane cast elastomers. These elastomers are made by pouring a reaction mixture into a mold where they are allowed to cure. Production can be carried out by a one-shot or prepolymer method; the latter being presently preferred. In this method a polyol of say, 1,000 to 3,000 m.w. and of the polyester or polyether type, is reacted with a stoichiometric excess of diisocyanate to produce a pre-polymer. Chain extension is then carried out with a chain extender of the type provided by this invention and discussed above. Some of the factors which have a bearing on the final properties are molecular structure, chain entanglement, and secondary bonding forces such as hydrogen bonding and van der Waals forces. These are controlled by selection of the molecular components employed, as well known in the art. For example, typically each backbone exhibits its own advantages and disadvantages; e.g. polyether types display better resilience, lower heat buildup, better hydrolytic stability, good low temperature properties, and low processing viscosity. The polyesters, however, are tough, abrasion-resistant elastomers with better oil resistance and can be produced at lower cost. It should be noted that these comparisons are made with urethanes having the same hardness.

The most common technique for producing high-quality castings is by use of an automatic dispensing machine. The machine degasses the prepolymer either in a batch or continuous mode and meters it along with the chain extender in controlled proportions to a mixhead. Here the components are mixed thoroughly, then discharged into a mold. A significant advantage in liquid casting is that less capital expense is required for processing equipment as compared to that needed for the thermoplastic or millable gum elastomers.

Urethane cast elastomers of the type known in the art have a hardness range of approximately 10 Shore A to 80 Shore D. These polymers are tough, abrasion resistant, with good mechanical strength and oxidation resistance. They are used in truck tires, grain chute liners, conveyor belts, gears, seals, and in many industrial parts.

As apparent from the description herein, this invention pertains to an improvement in the field of polyurethane chemistry. As well known, these polyurethanes as well as those made by the RIM process arise from the reaction of a polyol with a polyisocyanate. In the cast elastomer aspect of this invention, after or during the reaction of these substances, the chain length is extended via a polyhydric aromatic compound which may be mono- or di- or polynuclear as described above. In addition to the polyol, chain extender and isocyanate cast elastomer compositions of this invention may also include other materials commonly employed in making polyurethane cast elastomers, RIM or RRIM materials. Such additional materials have been discussed above.

Both polyalkylene ether glycol and polyester glycols can be used in forming the prepolymer and finished compositions of this invention.

Generally, the polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Polyalkylene ether glycols suitable for the preparation of polyurethane prepolymers should have a molecular weight of at least 500, although it can be as high as 10,000. Molecular weights of about 750 to 3000 are preferred. Optionally, glycols having molecular weights of less than about 350 can be added to the high molecular weight glycols. These low molecular weight glycols can be used in proportions of about 0.5–3.0 moles per mole of polyether glycol, but the exact proportions are determined by the desired physical properties of the final products.

Representative glycols include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, and the like. Mixtures of these, as well as the alcohols described below, can be employed.

For polyester polyols, they can be based on polyester glycols, such as poly(ethylene adipate), poly(ethylene/propylene adipate), poly(ethylene glutarate), and poly(ethylene pimelate). Polyester glycols suitable for the preparation of polyurethanes can be made by several alternate routes, such as: condensation of a dicarboxylic acid with an excess of a diol, transesterification of a dicarboxylic acid ester of a lower alcohol with a diol, or reaction of dicarboxylic acid dichloride with diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for making polyurethane prepolymers. Generally, the above described polyester glycols should have a molecular weight of 400–7000, a molecular weight of 750–3000, being preferred. Because of their greater reactivity, aromatic diisocyanates are preferred but aliphatic or araliphatic diisocyanates also can be used. Representative isocyanates include toluene-2,4-diisocyanate, toluene-2,6-diisocyanate, benzene-1,3-diisocyanate, naphthalene-1,5-diisocyanate, methylenebis(4-phenylisocyanate), 4,4'-biphenylenediisocyanate, hexamethylenediisocyanate, 1,4-cyclohexanediisocyanate, and methylenebis(4-cyclohexaneisocyanate) and the other isocyanates mentioned above. Mixtures of two or more diisocyanates may be employed. The addition of minor amounts of aliphatic or cycloaliphatic diisocyanates to prepolymers based on aromatic diisocyanates is useful for increasing the hardness of cured products without decreasing the pot life.

In order to carry out the process of preparing a cast elastomer according to this invention, a reaction product comprising free isocyanate groups is made by reacting a diol, of the type described above, or a mixture thereof, with a stoichiometric excess of diisocyanate component. In some instances, a large excess can be added to the reaction zone and subsequently some of the excess removed by a distillation or flash under reduced pressure. Alternatively, the desired excess can be added to the reaction zone. In either mode, the initial process step yields a pre-product which has not yet been extended by the chain extender(s) provided by this invention.

The amount of diisocyanate which is used is generally from about 1.1 to 2 moles per mole of polyol. This prepares a prepolymer which can then be reacted with the polyhydroxy aromatic compound which acts as a "curing agent" in this cast-elastomer embodiment. It may be desirable to admix the curing agent and the prepolymer after the prepolymer has been heated to a temperature to reduce the viscosity of the pre-polymer. This temperature is usually above about 70° C. However, the temperature should not be so high as to exceed the point at which the prepolymer or any material admixed therewith undergoes an undesirable amount of thermal decomposition. Generally this can be avoided by keeping the temperature below about 100° C.

As with the RIM process of the invention which is described above, the polymerization which comprises the cast elastomer process can be accelerated, if desired, by use of a catalyst. As catalysts, one may use a tin (II) salt of a carboxylic acid, e.g. dibutyl tin maleate, or a basic nitrogen compound such as tetraethyl ammonium hydroxide, or an alkaline compound such as sodium methoxide or phenolate. When used, the catalyst may comprise about 0.00001–10 weight percent, and preferably from about 0.001 to about 1.0 weight percent of the total reaction mixture. Also, the polyurethane cast elastomer may contain additional components such as:

(a) a flame retardant such as tris-chloroethylphosphate, or
(b) emulsifiers such as the product formed from stearic acid and diethanolamine;
(c) foam stabilizers such as those which have a polydimethyl siloxane group bonded to a copolymer of ethylene oxide and propylene oxide;
(d) reaction decelerators such as HCl;
(e) dyes, fillers, cell regulators, bacteriostatic agent and the like.

As an example of a cast elastomer produced by the process of this invention, a prepolymer is first prepared by reacting tolylene diisocyanate (80% 2,4–20% 2,6-isomer) with a polyester of adipic acid and ethylene glycol such that the isocyanate number is 1.1. This prepolymer is then stirred with a sufficient quantity of methylenebis(2,6-di-sec-butylphenol) such that the isocyanate number is reduced to 1.0. The resultant mixture is poured into a mold that has been preheated to 110° C. The resultant product is removed from the mold after 5 minutes.

As an example of the RIM process of this invention, 85 parts by weight of a polyether having a hydroxyl number of 28 (obtained by addition of propylene oxide and subsequent addition of ethylene oxide to trimethylolpropane), are admixed with 12.5 parts of 4,4'-methylenebis(2,6-sec-butylphenol), 5 parts of monofluorochloromethane and 0.05 parts of a mixture of one mole of dibutyl tin delaurate and one mole of 2,3-dimethyl-3,4,5,6, tetrahydropyrimidine. The resultant mixture is reacted according to the RIM process with sufficient 4,4'-diphenylmethanediisocyanate so that the resultant mixture has an isocyanate number of 1.0.

The temperature of the mixture when introduced into the mold is about 25° C. The mold is preheated to a temperature of about 50° C. and the resultant product is removed after completion of reaction.

As a further demonstration of the use of dihydroxyaromatics as chain extenders or curing agents in accordance with this invention, a series of tests were made using the following standard mixture.

|  | Amt. |
|---|---|
| Polyol - Jefferson 6503[1] | 12.5 g |
| MDI - Isonate 143L[2] | 5.3 g |
| Polyurethane Modifier | (see following table) |
| Dibutyltin Dilaurate | One Drop |

[1]Jefferson 6503 is a polyether polyol of approximate molecular weight 6500. The hydroxyl number is 27 mg KOH/g
[2]Isonate 143L is a modified diphenylmethane diisocyanate containing a high percentage of pure diphenylmethane diisocyanate and a lesser amount of polycarbodiimide adducts. Its isocyanate equivalent is 143.5. The NCO content is 29.3 weight percent.

In this test the dihydroxyaromatic compound used as the polyurethane modifier is mixed with the polyol. (Solid modifiers are admixed and placed in an air circulated oven at 150° C. until a substantially homogeneous mixture is obtained, and then cooled in a nitrogen bag to room temperature.

To this mixture, one drop of catalyst is added and mixed. To the resultant blend, the MDI is added quickly. A timer is started and stirring by hand is initiated using a wooden paddle.

Observations are made as follows:

1. Gelation time—time in seconds from start of test to increased viscosity (thickening of reaction mixture).
2. Tack-free time—time in seconds from start of test to the point where the surface will not stick to an object.
3. Firm time—time in seconds from start of test to the point where the reaction mass will not yield under manual pressure (this is also the cure time).
4. Shore A hardness was determined after the sample was oven aged overnight at 100° C.

TABLE

| Compound | Mole Wt. | Wt. Used | Time in Seconds | | | | Shore A Hardness |
| | | | Gel | Tack Free | Firm | Remarks | |
|---|---|---|---|---|---|---|---|
| 4,4'-methylenebis(2,6-diisopropylphenol) | 368.5 | 5.69 | 63 | 480 | 540 | clear and rubbery | |
| 2 drops catalyst | | | 46 | 180 | 225 | | |
| 4,4'-methylenebis(2-methyl-6-tert-butylphenol | 340.5 | 5.26 | 80 | | overnight | clear amber | 76 |
| 4,4'-methylenebis(2,6-di-sec- | 425 | 6.55 | 65 | 440 | 590 | amber, rubbery | 64 |

TABLE-continued

| Compound | Mole. Wt. | Wt. Used | Gel | Tack Free | Firm | Remarks | Shore A Hardness |
|---|---|---|---|---|---|---|---|
| butylphenol) 2 drops catalyst | | | 54 | 220 | 290 | | |
| 4,4'-methylenebis-2,6-xylenol | 256 | 3.95 | 68 | 4 min. | 11 min. | amber, rubbery | 98 |
| 4,4'-methylenebis(2,6-diethylphenol) | 312 | 2.41 | 116 | 523 | 23 min. | orange, rubbery | 34 |
| 4,4'-methylenebis(2,6-dicylopentylphenol) | 472.6 | 7.3 | 105 | 270 | 540 | dissolved amber gluey rubbery | |
| 4,4'-ethyledenebis(6-tert-butyl-o-cresol) | 354 | 5.47 | 90 | 1 hr. 18 min. | 5 hrs. 12 min. | amber, rubbery | 48 |
| 4,4'-n-butylidenebis(6-tert-butyl-o-cresol) | 382 | 5.90 | 64 | 100 min. | 5 hrs. 30 min. | yellow, rubbery | 98 |
| 4,4'-isopropyllidenebis(2,6-diisopropylphenol) | 396 | 1.9 | 60 | 510 | 20 min. | amber, rubbery | 70 |
| 4,4'-methylenebis(2,6-di-tert-butylphenol | 424.6 | 6.5 | | | | dark purple on dissolving crystal-lized on cooling | |
| resorcinol | 110.11 | 1.7 | 58 | 10 min. | 17 min. | clear and colorless | 32 |
| hydroquinol | 110.11 | 1.7 | 55 | 95 | 3 min. | clear colorless cheesy | 95 |
| bisphenol A | 228 | 3.5 | 83 | 1020 | 1040 | clear colorless | 79 |
| 6-methyl-3-isopropylcatechol | 166 | 2.56 | reacts very slowly, hardens in 24 hours | | | | |
| 3,6-diisopropylcatechol | 194 | 2.99 | reacts very slowly, gels in several hours, hardens in 24 hours | | | | |
| 3,6-di-tert-butyl-catechol | 222 | 3.4 | reacts very slowly | | | | |
| 2,2'-methylenebis(6-tert-butyl-4-methylphenol) | 340 | 5.25 | starts to gell in 5 min., hardens overnite | | | rubbery | |
| MOCA | 267 | 4.12 | 50 | 10 min. | 11 min. | rubbery | |

The data in the above table indicates that the dihydroxyaromatic compounds of the present invention are suitable for use in the preparation of cast elastomer polyurethanes. In a reaction injection molding process whereby the liquid chemicals are warmed prior to mixing and injection into a heated mold one would expect the gelation times set forth in the table to be reduced by a factor of at least three. Thus, the dihydroxyaromatic chain extender of the present invention also find use in the preparation of polyurethanes for making RIM molded products.

We claim:

1. A process for preparing a RIM polyurethane molded product, said process comprising
   (i) at a temperature within the range of about 15° C. to about 100° C. subjecting to static impingement mixing
      (a) a catalyst,
      (b) an organic polyisocyanate,
      (c) an aliphatic polyhydroxy compound having two or more aliphatic hydroxy groups and a molecular weight within the range of from about 400 to about 7000, and
      (d) an aromatic chain extender having two aromatic hydroxy groups each containing a reactive hydrogen which is either a liquid or soluble in said aliphatic polyhydroxy compound at a temperature within the range of about 15° C. to about 100° C. said dihydroxyaromatic chain extenders being selected from
   I. dihydroxybenzenes and alkyl-substituted dihydroxybenzenes, wherein the alkyl groups have up to about 6 carbon atoms and the total number of carbon atoms in the alkyl groups in said alkyl-substituted dihydroxybenzene has up to about 12 carbon atoms, and
   II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12; whereby a preproduct is produced,
   (ii) subsequently injecting a shot of said preproduct at said temperature into a closed preheated mold having a temperature of from about 15° C. to about 100° C.,
   (iii) opening the mold and removing the formed polyurethane molded product, and
   (iv) optionally subjecting said molded product to a post-cure at a temperature within the range of from about 50° C. to about 150° C. said process being conducted such that the amount of dihydroxyaromatic compound is from about 5 to about 30 weight percent of the total weight of components (a)-(d) and such that there is a substantially stoichiometric ratio of isocyanate groups on the one hand and the total of hydroxy groups in said aliphatic polyhydroxy compound and said dihydroxyaromatic chain extender on the other.

2. A method of preparing cast elastomer molded product, said process comprising
   (a) at a temperature of about 25° C. to about 150° C. forming a prepolymer by reacting (i) an organic polyisocyanate, and (ii) an aliphatic polyhydroxy compound having two or more aliphatic hydroxy groups and a molecular weight of about 400 to about 7000, subsequently
   (b) at a temperature of from about 80° C. to about 150° C. reacting with said prepolymer thereby produced a dihydroxyaromatic chain extender selected from
   I. dihydroxybenzenes and alkyl-substituted dihydroxybenzenes wherein the alkyl groups have up to about 6 carbon atoms and the total number of carbons atoms in the alkyl groups in said alkyl-substituted dihydroxybenzene is up to about 12 carbon atoms, and II. alkylene bridged, alkyl-substituted bisphenols wherein the alkylene bridge contains up to about 6 carbon atoms and the total number of carbon atoms in the alkyl groups attached to each benzeneoid nucleus is at least two but does not exceed about 12; said dihydroxyaromatic compounds being further characterized by having no more than one tert-alkyl group on a position adjacent to any hydroxyl group;

(c) said process being conducted such that the amount of dihydroxyaromatic compound is from about 5 to 30 weight percent of the total weight of said dihydroxyaromatic compound and components (i) and (ii) and such that there is a substantially stoichiometric ratio of isocyanate groups on the one hand and the total of hydroxy groups in said aliphatic dihydroxy compound and said dihydroxyaromatic chain extender on the other.

3. A process for preparing a reaction injection molding polyurethane molded product which comprises (i) at a temperature within the range of about 15° C. to about 100° C. subjecting to static impingement mixing two liquid streams, the first stream comprising (a) a catalyst, (b) an aliphatic polyhydroxy compound having two or more aliphatic hydroxy groups and a molecular weight within the range of from about 400 to about 7000, and (c) an aromatic chain extender having two aromatic hydroxy groups each containing a reactive hydrogen which is either a liquid or is soluble in said aliphatic polyhydroxy compound at a temperature within the range of about 15° C. to about 100° C; said dihydroxyaromatic compound being selected from I. dihydroxybenzenes and alkyl-substituted dihydroxybenzenes, wherein the alkyl groups have up to about 6 carbon atoms and the total number of carbon atoms in the alkyl groups in said alkyl-substituted dihydroxybenzene has up to about 12 carbon atoms, and II. alkylene bridged, alkyl-substituted bisphenols wherein the alkylene bridge contains up to about 6 carbon atoms and the total number of carbon atoms in the alkyl groups attached to each benzenoid nucleus is at least one but does not exceed about 12; and the second stream comprising (d) an organic polyisocyanate or prepolymer formed from an organic polyisocyanate and an aliphatic polyhydroxy compound whereby a liquid mixture is produced, (ii) subsequently injecting a shot of said liquid mixture at said temperature into a closed preheated mold having a temperature of from about 15° C. to about 100° C., (iii) opening the mold and removing the formed polyurethane molded product, and (iv) optionally subjecting said molded product to a post-cure at a temperature within the range of from about 50° C. to about 150° C.; said process being conducted such that the amount of dihydroxyaromatic compound is from about 5 to about 30 weight percent of the total weight of components (a)-(d) and such that there is a substantially stoichiometric ratio of isocyanate groups on the one hand and the total of hydroxy groups in said aliphatic polyhydroxy compound and said dihydroxyaromatic chain extender on the other.

* * * * *